US008913763B2

(12) United States Patent
Okabayashi et al.

(10) Patent No.: US 8,913,763 B2
(45) Date of Patent: Dec. 16, 2014

(54) MIXING CONSOLE

(75) Inventors: Masaaki Okabayashi, Hamamatsu (JP); Takamitsu Aoki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1153 days.

(21) Appl. No.: 12/840,164

(22) Filed: Jul. 20, 2010

(65) Prior Publication Data

US 2011/0019840 A1 Jan. 27, 2011

(30) Foreign Application Priority Data

Jul. 21, 2009 (JP) ................................. 2009-169974

(51) Int. Cl.

*H04B 1/00* (2006.01)
*H04H 60/04* (2008.01)
*H04R 1/10* (2006.01)
*H04S 7/00* (2006.01)
*H04R 27/00* (2006.01)
*H04S 3/00* (2006.01)

(52) U.S. Cl.

CPC .............. *H04R 1/1091* (2013.01); *H04R 27/00* (2013.01); *H04H 60/04* (2013.01); *H04S 3/008* (2013.01); *H04S 7/30* (2013.01)
USPC ............... 381/119; 381/77; 381/85; 381/123; 700/94

(58) Field of Classification Search

CPC ...... H04R 1/1091; H04R 27/00; H04H 60/04; H04S 7/30; H04S 3/008; G11B 27/038; G11B 27/028; G11B 27/036
USPC .................. 381/119, 22, 23, 82, 85, 77, 123; 700/94
See application file for complete search history.

(56) References Cited

U.S. PATENT DOCUMENTS

| | | | | |
|---|---|---|---|---|
| 2002/0082732 | A1 | 6/2002 | Suyama et al. | |
| 2004/0073419 | A1 * | 4/2004 | Aoki et al. | 704/201 |
| 2006/0064187 | A1 | 3/2006 | Nishikori et al. | |

FOREIGN PATENT DOCUMENTS

| | | |
|---|---|---|
| JP | 2002-325300 | 11/2002 |

* cited by examiner

*Primary Examiner* — Vivian Chin
*Assistant Examiner* — Con P Tran
(74) *Attorney, Agent, or Firm* — Morrison & Foerster LLP

(57) ABSTRACT

N input channel signals from an input channel section having N input channels are selectively supplied to M mixing buses and cue buses. Mixed outputs from the mixing buses are supplied, via talkback input sections, to an output channel section having M output channels, and M output channel signals from the output channel section are patched to output ports via an output patch section. Talkback signal from a talkback supply section is supplied to the talkback input sections. When a talkback function is ON, a talkback signal is mixed with the mixed outputs from the mixing buses and then output to the output channels, during which time the mixed outputs are temporarily attenuated.

4 Claims, 5 Drawing Sheets

MIXING CONSOLE

BACKGROUND

The present invention relates to mixing consoles having a talkback function.

Heretofore, mixing consoles for use in concert halls etc. have been known, which mix audio signals, output from a multiplicity of microphones, electric and electronic musical instruments, etc. disposed on a stage etc., after adjusting levels and frequency characteristics of the audio signals and then output the mixed audio signals to a power amplifier. A human operator, operating such a mixing console, operates various panel controls of a digital mixer to adjust volumes and colors of audio signals of musical instrument tones and singing voices into states that appear to most suitably express a performance. The mixing console includes mixing buses for mixing sound signals (audio signals) supplied from input channels, and output channels for outputting mixed sound signals. Each of the input channels controls frequency characteristics, mixing level, etc. of a sound signal input thereto and then outputs the thus-controlled sound signal to the individual mixing buses, and each of the mixing buses mixes the sound signals input from the input channels and outputs the mixed sound signal to a corresponding one of the output channels. Output signals from the output channels are amplified and audibly output through speakers etc.

When the conventionally-known mixing console is to be adjusted, a human operator may adjust the mixing console by communicating with musicians, staff, etc. on a stage. For the purpose of such communication between the human operator and the musicians etc., the mixing console is equipped with a talkback function. Namely, a voice of the human operator is supplied to mixing buses as a talkback signal, and the talkback signal output from the mixing buses to output channels is audibly output through a stage monitor speaker disposed on the stage. In this way, communication can be made between the human operator and the musicians, staff, etc. on the stage. One example of the mixing consoles is known, for example, from Japanese Patent Application Laid-open Publication No. 2002-325300.

In the conventionally-known mixing console, mixing processing is performed by a DSP (Digital Signal Processor). FIG. 6 is a block diagram explanatory of a mixing processing algorithm executed in a conventionally-known mixing console equipped with a talkback function.

In the mixing console 100 shown in FIG. 6, digital signals are input to an input patch section 130 from a plurality of input ports. In the input patch section 130, the input ports are selectively patched (coupled) N (N is an integral number) input channels 131-1, 131-2, 131-3, . . . , 131-N of an input channel section 131. To each of the input channels 131-1 to 131-N is supplied an audio signal 1*n*.1, 1*n*.2, 1*n*.3, . . . , 1*n*.N from the input port patched thereto by the input patch section 130. In each of the input channels 131-1 to 131-N of the input channel section 131, the audio signal supplied thereto (i.e., input channel signal) is adjusted in acoustic characteristics and controlled in send level, so that the thus-adjusted and controlled audio signal is sent to M (M is an integral number) mixing buses 136 and left (L) and right (R) stereo cue buses 137. In this case, each of the signals of the N input channels (N input channel signals) output from the input channel section 131 is selectively output to one or more of the M mixing buses 136. In each of the M mixing buses 136, the signals of the one or more input channels (i.e., one or more input channel signals) selectively input thereto are mixed together. Thus, a total of M different mixed signals are output to M output channels 133-1, 133-2, 133-3, . . . , 133-M of an output channel section 133.

In each of the output channels 133-1-133-M, characteristics of the audio signal mixed in the corresponding mixing bus 136 are adjusted and then output to an output patch section 135 as an output channel signal Mix1, Mix2, Mix3, . . . , Mix.M. In the output patch section 135, any one of the M output channel signals Mix.1, Mix.2, Mix.3, . . . , Mix.M can be selectively patched (coupled) to any one of a plurality of output ports, so that the signal patched by the output patch section 135 can be supplied to the one output port. In the output ports, the signals of the output channels are converted into analog output signals, amplified by an amplifier, and then audibly reproduced or sounded through a plurality of speakers disposed on a stage or installed in a venue. Further, in each of L and R cue buses, signals selectively input from any one or more of the N input channels are mixed into a cuing/monitoring signal, so that the cuing/monitoring signal is output to a cue/monitor section 134. A talkback signal is also input to the cue/monitor section 134 directly from a talkback section 132, and either the signals from the cue buses 137 or the talkback signal is selected in the cue/monitor section 134 and output as a cue/monitor signal. The cue/monitor signal is then output as an audible sound from a monitoring speaker, headphones attached to the human operator so that the human operator can listen to the sound for checking purposes. Further, the talkback signal from the talkback section 132 is also supplied to the M mixing buses 136 and L and R cue buses 137 so that the talkback signal is mixed to the output channel signals Mix.1-Mix.M and cue/monitor signal.

FIG. 7 is a circuit block diagram showing a detailed construction of the cue/monitor section 134. In the cue/monitor section 134, a signal from the cue bus 137 is input to a fixed contact a10 of a first switch SW11, a signal from another source is input to a fixed contact b10, and any one of the signals selected by a first switch SW1 is output as a cue output from a movable contact c10 and supplied to a second switch SW111. The signal selected by the first switch SW111 is input to a fixed contact a11 of the second switch SW111, and the talkback signal from the talkback section 132 is input to another fixed contact b11 of the second switch SW111. Any one of the signals selected by the second switch SW111 is output from a variable contact c11. The signal output from the second switch SW111 is output as a monitor output via a dimmer 112 that temporarily attenuates the level of the signal. Once the talkback function is turned on, the second switch SW111 is switched to the fixed switch b11 (i.e., talkback side), but also the dimmer 112 comes to be capable of temporarily attenuating the level of the talkback signal output from the second switch SW111. In this manner, a voice uttered by the human operator is attenuated and thus can be prevented from being fed back through the monitoring speaker etc. When the talkback function is OFF, in the other hand, the dimmer 112 outputs the signal from the second switch SW111 as a monitor output without attenuating the level of the signal, When the talkback function is ON in the conventionally-known mixing console 100 shown in FIG. 6, a voice uttered by the human operator toward a talkback microphone is supplied from the talkback section 132 to the mixing buses 136 and cue buses 137, where it is mixed with a plurality of audio signals. Thus, the human operator's voice mixed with the plurality of audio signals can be heard by musicians etc. on the stage through the stage monitor speaker via the output channel section 133 and output patch section 135. Further, a voice uttered by a musician toward a microphone on the stage is supplied to the mixing buses 136 and cue buses 137 via the input patch section 130 and input channel section 131. Thus, the human operator can hear the musician's voice by listening to a cue output from the cue/monitor section 134. However, it tends to be difficult for the musician on the stage, who is talking with a human operator, to hear the human operator's voice because the human operator's voice is mixed with the plurality of audio signals.

Namely, the conventionally-known mixing console presents the problem that it cannot satisfy a desire for mainly hearing a talkback signal alone during talkback conversation. If send levels of a plurality of audio signals to be supplied to the mixing buses 136 are lowered when a talkback signal is sent to the mixing buses 136, a musician conversing with a human operator through talkback can mainly hear a voice of the human operator. However, there is a need to set send levels of the N input channels 131-1-131-N separately for each of the M mixing buses 136, which would require setting operation comprising an enormous number of setting steps and also require extremely cumbersome setting operation for returning the console to a normal-use state.

SUMMARY OF THE INVENTION

In view of the foregoing, it is an object of the present invention to provide an improved mixing console which allows a talkback signal to be mainly heard on a stage during talkback conversation, without requiring setting operation comprising an enormous number of setting steps.

In order to accomplish the above-mentioned object, the present invention provides an improved mixing console, which comprises: an input channel section having N (N is an integral number equal to or greater than one) input channels which control levels of input audio signals separately for each mixing bus and output the level-controlled audio signals; M (M is an integral number equal to or greater than one) the mixing buses each of which mixes the audio signals, supplied from the input channel section, to output a mixed signal; an output channel section having M output channels which are supplied with the mixed signals output from the mixing buses; M talkback input sections provided at a stage preceding respective ones of the output channels of the output channel section; a selection section which selects at least any one of the M talkback input sections; and a talkback supply section to which a voice signal from a human operator is input as a talkback signal in response to talkback-on operation, and which supplies the talkback signal to the talkback input sections. When the talkback signal is supplied at least to the talkback input section selected by the selection section, the talkback input section selected by the selection section attenuates an amplitude of the mixed signal supplied from a corresponding one of the mixing buses, mixes the supplied talkback signal with the attenuated mixed signal to thereby generate a mixed output signal, and supplies the mixed output signal to a corresponding one of the output channels.

According to the present invention, when the talkback function is ON, a mixed output (i.e., mixed signal) having a talkback signal mixed therewith is output from the mixing bus after being temporarily attenuated, and thus, a person can mainly hear the talkback signal when monitoring the mixed signal. Thus, when the mixed signal, having the talkback signal mixed therewith, is to be monitored via the output channel on a stage or the like, a musician or the like on the stage can mainly hear a voice of a human operator. In this case, because attenuation amounts of dimmers can be set independently for monitor outputs from the individual output channels, the present invention allows conditions of mixing between output signals of the output channels and the talkback signal to be set individually as desired.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

Figure 1:
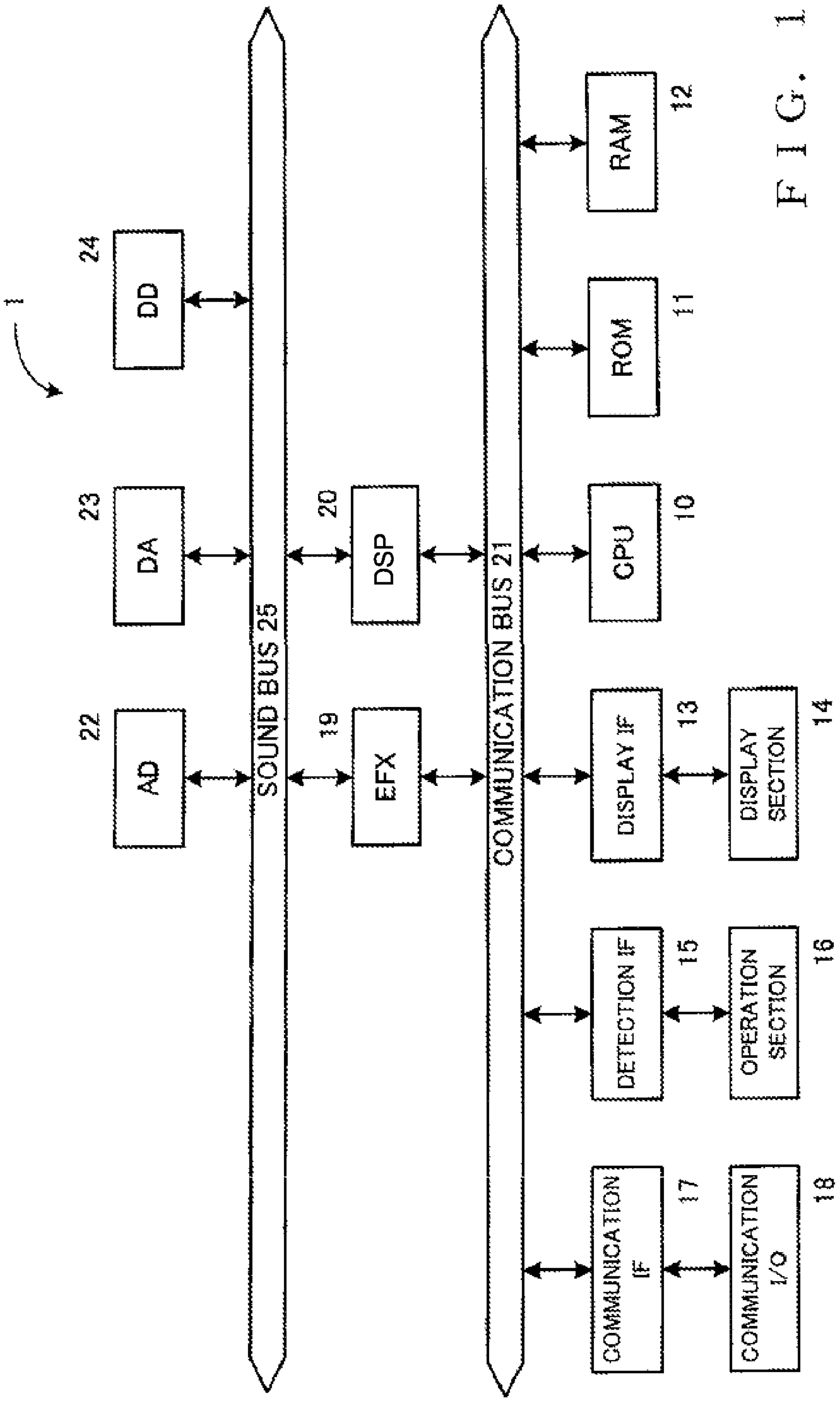
FIG. 1 is a block diagram showing an example construction of an embodiment of a mixing console of the present invention.

FIG. 1 is a block diagram showing an example construction of an embodiment of a mixing console of the present invention. In the mixing console 1 of FIG. 1, a CPU (Central Processing Unit) 10 executes a management program (i.e., OS (Operating System)) to control overall operation of the entire mixing console 1. The mixing console 1 includes a non-volatile ROM (Read-Only Memory) having stored therein operating software, such as a mixing control program, which is to be executed by the CPU 10, and a RAM (Random Access Memory) 12 including a working area for the CPU 10 and storage regions for storing various data etc. The CPU 10 executes the mixing control program, so that a DSP (Digital Signal Processor) 20 performs sound signal processing on a plurality of input sound signals (audio signals) to thereby perform mixing processing on the sound signals. The ROM 11 is preferably implemented by a rewritable ROM. such as a flash memory, such that version upgrade of the operating software can be facilitated. Under the control of the CPU 10, the DSP 20 performs digital signal processing for mixing processing on input sound signals after adjusting volume levels and frequency characteristics of the input sound (audio) signals on the basis of set parameters and controlling acoustic characteristics, such as volume, panning and effect, of the sound signals on the basis of parameters. Under the control of the CPU 10, an effecter (EFX) 19 imparts effects, such as reverberation, echo and chorus effects, to the mixed audio signals.

A display interface (IF) 13 is an interface for displaying various mixing-related screens on a display section 14 comprising a display device, such as a liquid crystal display. A detection interface (IF) 15 detects operation on an operation section 16 including various controls, such as faders, knobs and switches, provided on an operation panel of the mixing console 1 by scanning the operation section 16, and, on the basis of detected operation signals, it can change values of parameters to be used in the sound signal processing. The operation section 16 include a switch for turning on or off a talkback function. A communication interface (IF) 17 is an interface for communicating with external equipment via a communication I/O 18, which is a network interface, such as the Ethernet (registered trademark). The CPU 10, ROM 11, RAM 12, display interface 13, detection interface 15, communication interface 17, EFX 19 and DSP 20 communicate data etc. with one another via a communication bus 21.

The EFX 19 and DSP 20 communicate data with an AD 22, DA 23 and DD 24 via a sound bus 25. The AD 22 comprises a plurality of analog input ports for inputting analog signals to the mixing console 1, and analog signals input via the AD 22 are converted into digital signals and sent to the sound bus 25. The DA 23 comprises a plurality of analog output ports for outputting mixed signals to outside of the mixing console 1, and digital output signals received by the DA 23 via the sound bus 25 are converted into analog signals and audibly output through speakers disposed on a stage and/or installed in a venue. The DD 24 comprises a plurality of digital input/output ports for inputting digital signals to the mixing console 1 and outputting mixed digital signals to outside of the mixing console 1. Digital input signals input via the DD 24 are sent to the sound bus 25, and digital output signals received via the sound bus 25 are output to a digital recorder etc. Note the digital signals sent from the AD 22 and DD 24 are received by the DSP 20, where the digital signals are subjected to the above-mentioned digital signal processing. Further, mixed digital signals sent from the DSP 20 to the sound bus 25 are received by the DA 23 or DD 24.

Figure 2:
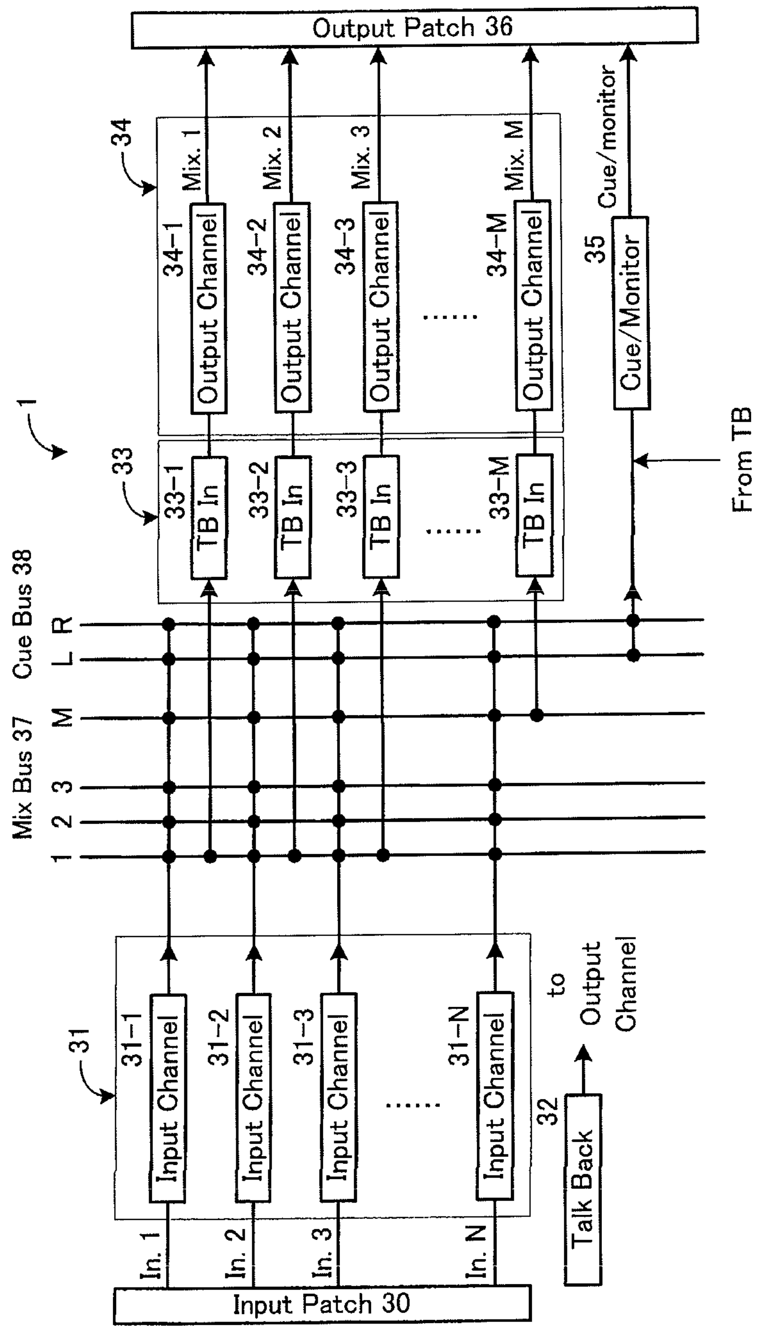
FIG. 2 is a block diagram explanatory of a mixing processing algorithm executed in the embodiment of the mixing console.

FIG. 2 is a block diagram explanatory of a mixing processing algorithm executed in the mixing console 1. In FIG. 2, analog signals input to the plurality of analog input ports (AD 22) are input to an input patch section 30 after being converted into digital signals, and digital signals input to the plurality of digital input ports (DD 24) are input as-is to the input patch section 30. The input patch section 30 selectively patches (couples) each of the plurality of input ports, which are signal input sources, to any one of N (N is an integral number equal to or greater than one) input channels 31-1, 31-2, 31-3, . . . , 31-N of an input channel section 31. Thus, audio signals In.1, In.2, In.3, . . . , In.N from the respective input ports, patched by the input patch section 30, to the input channels 31-1-31-N.

In each of the input channels 31-1 to 31-N of the input channel section 31, the audio signal supplied thereto (i.e., input channel signal) is adjusted in acoustic characteristics and controlled in send level, so that the thus-adjusted and controlled audio signal is sent to M mixing buses 37 and left (L) and right (R) stereo cue buses 38. In this case, each of N input channel signals output from the input channel section 31 is selectively sent to one or more of the M mixing buses 37. In each of the M mixing buses 37, one or more input channel signal selectively input from one or more of the N input channels are mixed together. Thus, a total of M different mixed signals (mixed outputs) are output from the M mixing buses 37. The mixed signals from individual ones of the M mixing buses 37 are supplied to corresponding ones of M talkback input sections (TB In) 33-1, 33-2, 33-3, . . . , 33-M of a talkback input unit 33. The M talkback input sections (TB In) 33-1-33-M will hereinafter be referred to also as "TB switching section (TB In)". A talkback signal from a talkback supply section 32 is input only to one TB switching section selected by the human operator from among the TB switching sections 33-1-33-M. The one B switching section, to which the talkback signal is being input, attenuates the level of the mixed output from the corresponding mixing bus 37 by a predetermined amount and mixes the talkback signal with the thus-attenuated mixed output, so that the mixture of the attenuated mixed output and talkback signal is output to a corresponding output channel. The human operator selects at least one of the mixing buses 37 to which the talkback signal is to be supplied, to thereby select the TB switching section connected to the selected mixing bus 37. Thus, the talkback signal will be supplied only to the selected TB switching section. The selected mixing bus 37 is one mixing bus 37 that outputs a signal to a state monitor speaker of another person whom the human operator wants to talk or communicate with. Further, for the other TB switching sections, to which the talkback signal is not being input, the mixed outputs from the mixing buses 37 are supplied directly to the corresponding output channels. In this manner, outputs from the M TB switching sections 33-1-33-M of the talkback input unit 33 are supplied to corresponding ones of M output channels 34-1, 34-2, 34-3, . . . , 34-M of an output channel section 34 provided at a stage succeeding the TB switching sections 33-1-33-M.

In each of the M output channels 34-1-34-M, acoustic characteristics, such as frequency balance, of the signal are adjusted by an equalizer and compressor. Thus, output channel signals Mix.1, Mix.2, Mix.3, . . . , Mix.4 are output from the output channel section 34 to an output patch section 36. Further, in each of L and R cue buses 38, one or more input channel signals selectively input thereto from one or more of the N input channels are mixed into a cueing/monitoring signal, so that the resultant cueing/monitoring signal is output to a cue/monitor section 35. A cue/monitor output from the cue/monitor section 35 is output to an output patch section 36.

The output patch section 36 can selectively patch (couple) each of the output channel signals Mix.1-Mix.4 from the output channel section 34 and cue/monitor output from the cue/monitor section 35 to any one of the plurality of the output ports (DA23 and DD24). The output channel signals patched by the output patch section 36 are supplied to corresponding ones of the output ports. In each of the output ports of the DA23, a digital output channel signal is converted into an analog output signal, amplified by an amplifier and audibly output through any of a plurality of speakers installed in the venue. Further, the analog output signal is supplied to an in-ear monitors attached to the ears of any of musicians etc. on the stage and/or reproduced through a stage monitor speaker disposed near the musician or the like. Further, a digital audio signal output from each of the digital output ports of the digital output port section (DD 24) is supplied to a recorder, externally-connected DAT and/or the like for digital recording. Furthermore, the cue/monitor output is converted into an analog output signal in one of the output ports of the DA 23 assigned thereto by the output patch section 36 and then output through a monitoring speaker installed in an operator room, headphones attached to the human operator, etc., so that the human operator can check the cue/monitor output. The talkback signal from the talkback supply section 32 is also input to the cue/monitor section 35, so that either the signal from the cue buses 38 or the talkback signal is selected by the cue/monitor section 35 and output as the cue/monitor output.

Figure 3:
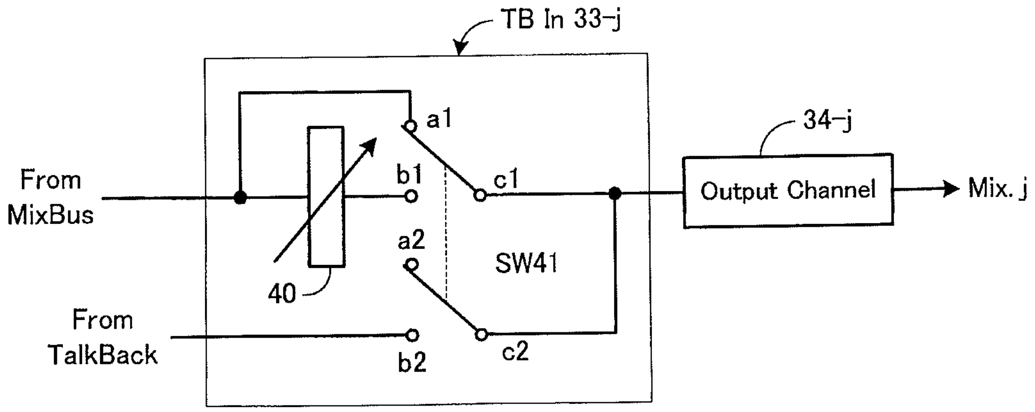
FIG. 3 is a circuit block diagram showing a detailed construction of a talkback input section in the embodiment of the mixing console.

The M (integral number equal to or greater than one) TB switching sections 33-1-33-M are constructed identically to each other, and FIG. 3 is a circuit block diagram showing a detailed construction of a j-th TB switching section (TB In) 33-*j* of the M TB switching sections 33-1-33-M. In the TB switching section 33-*j* of FIG. 3, a switch SW41 is a two-circuit two-contact switch, where the mixed output from the mixing bus 37 is input to a fixed contact a1 of the first circuit and an output from a dimmer (attenuator) 40 for temporarily attenuating the amplitude level of the mixed output is input to a fixed contact b1 of the first circuit. Further, a fixed contact a2 of a second circuit is open, and the talkback signal from the talkback supply section 32 is input to a fixed contact b2. A movable contact c1 of the first circuit and a movable contact c2 of the second circuit are interconnected so that signals output from the first and second circuits are mixed together.

FIG. 3 shows the switch SW41 in a state when the talkback function is OFF, or when the instant TB switching section 33-*j* is not currently selected as the one talkback input section to which the talkback signal is to be supplied. In such a state, the output mixed signal from the mixing bus 37 is output as-is from the TB switching section 33-*j* and supplied directly to the output channel 34-*j*, and the talkback signal is cut. On the other hand, when the instant TB switching section 33-*j* has been selected as the one talkback input section to which the talkback signal is to be supplied, and when the talkback function is ON (i.e., when the talkback signal is to be supplied to the instant TB switching section 33-*j*), the switch SW41 is switched to the contacts b1 and b2, so that the output mixed signal from the mixing bus 37 having been attenuated via the dimmer 40 and the talkback signal supplied from the talkback supply section 32 are selected, mixed together and then output. As a modification, the switch SW41 may be switched to the contacts b1 and b2, irrespective of whether the talkback function is ON or OFF, once the instant TB switching section 33-*j* is selected as the one talkback input section to which the talkback signal is to be supplied. In such a case, the dimmer 40 may be constructed to provide no or zero attenuation as long as the talkback function is OFF (i.e., as long as the talkback function is not supplied).

Referring back to FIG. 2, a voice signal from the human operator is input, as a talkback signal, to the talkback supply section 32 via a not-shown microphone. While the human operator is performing talkback-ON operation by actuating a switch provided on the microphone or other suitable position, a voice signal uttered from the human operator is input, as a talkback signal, to the talkback supply section 32, so that the talkback signal is supplied from the talkback supply section 32 to the talkback input unit 33 (TB switching sections 33-1-33-M). As noted above, only one of the TB switching sections 33-1-33-M is selected, and the talkback signal is selected via the switch SW41 only in the selected talkback input section (TB switching section 33-1-33-M) so that the talkback signal is mixed with the mixed output signal from the mixing bus 37 and then output. Once the switch provided on the switch provided on the microphone or other suitable position of the talkback supply section 32, the talkback function is turned off, so that the talkback signal is not supplied to the talkback input unit 33 (TB switching sections 33-1-33-M) and thus the mixing of the talkback signal is not performed.

Figure 6:
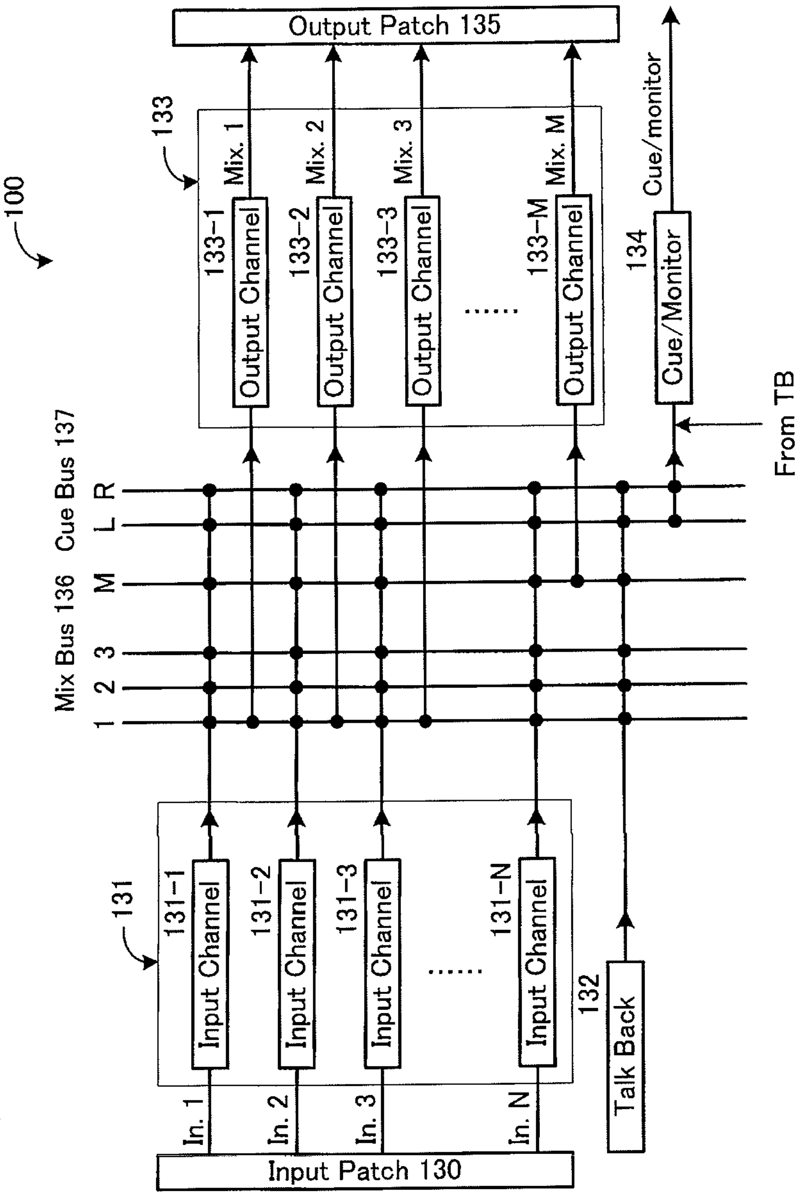
( PRIOR ART ) F I G. 6
FIG. 6 is a block diagram explanatory of a mixing processing algorithm executed in a conventionally-known mixing console.

Let it be assumed that the TB switching section 33-*j* is selected by the human operator as the TB switching section (talkback input section) to which the talkback signal is to be supplied. In this case, once the talkback function is turned ON, the switch S41 is switched to the opposite contacts from those shown in FIG. 3, so that not only the mixed signals from the mixing bus 37 is output after being temporarily attenuated in level but also the talkback signal is output. Then, the attenuated mixed signal output from the dimmer 40 and the talkback signal are mixed and then supplied to the output channel 34*j*. The attenuation amount by the dimmer 40 can be set at any desired amount. Further, the cue/monitor section 35 in the instant embodiment is constructed in the same manner as the cue/monitor section in the conventionally-known mixing console 100 shown in FIG. 6 and thus will be not described here.

In the mixing console 1 of the present invention, as set forth above, as the human operator talks toward the microphone after turning on the switch of the microphone, connected to the talkback supply section 32, to activate the talkback function, a talkback signal output from the talkback supply section 32 is supplied to any one of the output channels 34-1-34-M, (connected to the output of the talkback supply section 32 via the TB switching sections) which has been selected by the human operator. Thus, as long as the talkback function is ON, an output channel signal from the one output channel comprises a mixture of an attenuated mixed output (mixed signal) and the talkback signal. This output channel signal is audibly output through the stage monitor provided on the stage for a musician or the like whom the human operator wants to communicate with; thus, the voice uttered by the human operator can be heard only by the accessed musician or the like on the stage whom the human operator wants to communicate with. In this case, because the level of the mixed output, with which the talkback signal is mixed, is attenuated by the dimmer 40 as long as the talkback microphone is ON, the accessed musician or the like on the stage can mainly hear the voice uttered from the human operator. Further, the talkback signal is not supplied to each of the TB switching sections for the output channels allocated to the other musicians who need not hear the voice uttered from the human operator, and, in each of these TB switching sections, the mixed output is output, bypassing the dimmer 40. Thus, not only the musician accessed by the human operator can mainly hear the voice uttered from the human operator, but also the other musicians who need not hear the voice uttered from the human operator can monitor the mixed output (mixed signal).

Figure 4:
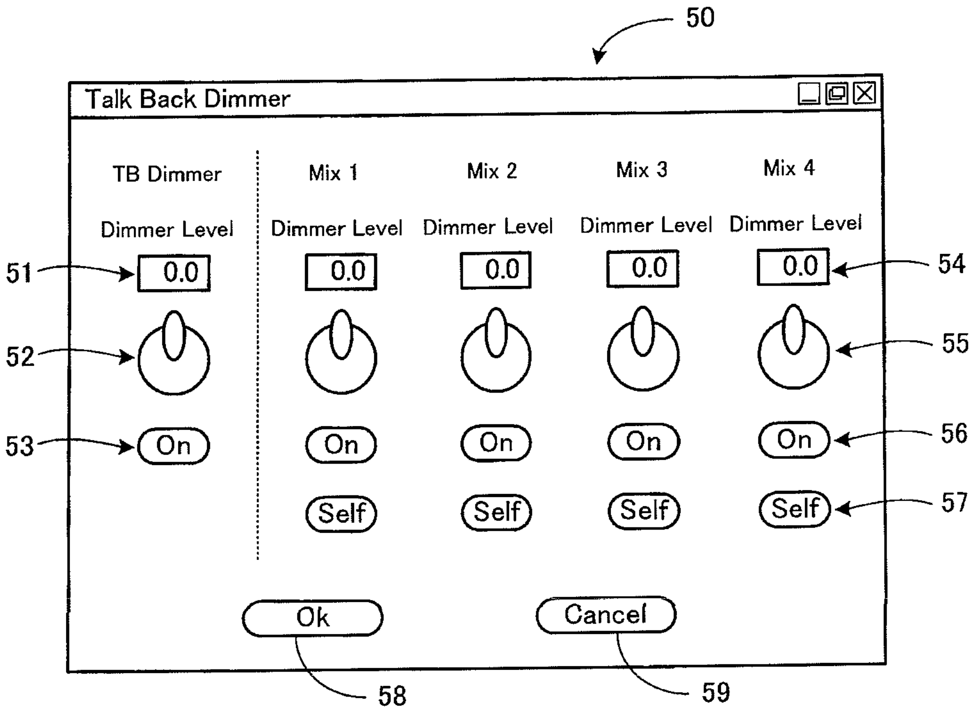
FIG. 4 is a diagram showing a screen of a dimmer value user interface in the embodiment of the mixing console.

FIG. 4 is a diagram showing a user interface screen of a dimmer value user interface (UI) 50 for setting the dimmers 40 in the TB switching sections 33-1-33-M.

With the user interface screen of the dimmer value user interface (UI) 50 displayed on the display section 14, it is possible to set the respective dimmers 40 in the TB switching sections 33-1-33-M. In the user interface screen of the dimmer value user interface (UI) 50, a region demarcated by broken line and labeled “TB Dimmer” illustratively shows a collective setting section for collectively setting the M (integral number equal to or greater than one) dimmers 40 in the TB switching sections 33-1-33-M, while a region labeled “Mix1 Mix2 Mix3 Mix4” illustratively shows an individual setting section for individually setting the M dimmers 40 in the TB switching sections 33-1-33-M. Although all of the M dimmers 40 are not shown in the figure, all of the M dimmers 40 corresponding to the M output channels can be set in the individual setting section. Here, once a switch 53 of the collective setting section is turned on, the M dimmers 40 in one or more of the TB switching sections 33-1-33-M which are in a collective setting mode as will be later described are collectively set for use, so that the switches 41 in the one or more TB switching sections 33-1-33-M are collectively switched to the talkback-ON side. At that time, dimmer values (Dimmer Levels), which are attenuation values of the M dimmers 40 in the TB switching sections 33-1-33-M, can be collectively set at a desired value. Once the dimmer values are collectively set at a desired value like this, the dimmer value corresponding to rotation (rotational position) of a knob 52 is displayed on a display section 51. As will be later described, the TB switching sections 33-1-33-M for which dimmers 40 can be collectively set are limited to those that have been set to not use the individual setting option.

In the individual setting section, each of the "Mix1", "Mix2", "Mix3" and "Mix4" individual setting regions is arranged to set the TB switching section corresponding to the output channel signal in question. In this case, the "Mix1", "Mix2", "Mix3" and "Mix4" individual setting regions for setting the TB switching sections are constructed identically to each other. The following describe how to set the TB switching section 33-1 connected at its output end with the output channel 34-1. Once the switch ("self") 57 is turned on in the "Mix1" individual setting region, the TB switching section 33-1 is set to use the individual setting option. Then, once the switch 56 is turned on, a setting is made to use the dimmer 40 in the TB switching section 33-1, i.e. in the output channel 34-1, so that the above-mentioned switch 41 is switched to the talkback side (i.e., to the fixed contacts b1 and b2), or switched to a state where it is switchable in interlocked relation to talkback-ON operation (hereinafter "switchable state"). Further, when both the switch ("self") 57 and the switch 56 are ON, the dimmer value (Dimmer Level), which is an attenuation amount of the dimmer 40 in the TB switching section 33-1, can be set at a desired value through operation of a knob 55. At that time, the dimmer value corresponding to the rotation of the knob 55 is displayed on a display section 54. In this manner, whether or not to use the individual setting option in the TB switching section 33-1-33-M, i.e. in the output channel 34-1-34-M, can be set separately or individually for each of the output channels 34-1-34-M, through operation of the switch (self) 57 corresponding to the output channel. Furthermore, in the case where the individual setting option is used, whether or not to use the dimmer 40 can be set (selected) separately or individually for each of the output channels 34-1-34-M, but also the dimmer value can be set at a desired value separately for each of the output channels 34-1-34-M.

In each TB switching section which is set to not use the individual setting option with the switch (self) 57 placed in the OFF position in the individual setting section, the knob 55 and the switch 56 in the individual setting region are displayed in grayout and placed in an inoperable state, but also the display section 54 is deilluminated so that, even if a dimmer value has been set through the knob 55, the dimmer value is displayed in grayout. Further, in each TB switching section for which the switch (self) 57 is OFF, settings made in the collective setting section are reflected.

Namely, one or more TB switching sections (output channels) are grouped into a single group as objects of collective setting. Once the switch 53 is turned on in the collective setting section, a dimmer value (attenuation amount) of the dimmer 40 currently set in the display section 51 of the collective setting section is set commonly (as a common dimmer value (attenuation amount)) of the dimmers 40 of the individual TB switching sections in the group of objects of collective setting. Further, by operating the knob 52 in the collective setting section, the dimmer values (attenuation amounts) of the dimmers 40 of the TB switching sections belonging to the group of objects of collective setting can be adjusted commonly (collectively). In this case, in response to turning-on of the switch 53, the switches SW41 of each of the TB switching sections belonging to the group of objects of collective setting is switched to the talkback side (i.e., to the fixed contacts b1 and b2), or switched to a state where it is switchable in interlocked relation to talkback-ON operation ("switchable state").

In each TB switching section which is set to use the individual setting option with the switch (self) 57 placed in the ON position in the individual setting section, the knob 55 and the switch 56 in the individual setting region are displayed in a predetermined original color and placed in an operable state. In this case, if the switch 56 is currently in the OFF position such that the TB switching section is set to not use the dimmer 40, the display section 54 is deilluminated so that, even if a dimmer value has been set through the knob 55, the dimmer value is displayed in grayout, and the dimmer value to be set in the dimmer 40 is set at zero ("0"). Once the switch 56 is turned on to set the TB switching section to use the dimmer 40, the display section 54 of the TB switching section is illuminated so that a dimmer value having been set through the knob 55 is displayed in a bright color. The thus-displayed dimmer value is set into the dimmer 40, but also the corresponding switch SW41 is placed in the switchable state as noted above. As apparently from the foregoing, the switches 56, 53 and 57 function as a selection section for selecting a TB switching section where a talkback signal is to be mixed. Namely, any desired one of the TB switching sections 33-1-33-M can be individually selected in response to a combination of ON operation of the switch 56 and ON operation of the switch 57, and one or more TB switching sections in a group of objects of collective setting can be collectively selected in response to a combination of ON operation of the switch 53 and ON operation of the switch 57.

The switches and knobs on the dimmer value user interface 50 can be operated via a pointing device, such as a mouse. Then, once an OK button is clicked on the dimmer value user interface 50, settings having been made so far are set into the TB switching sections 33-1-33-M. On the other hand, once a Cancel button 59 is operated, settings having been made so far are discarded, so that setting states of the TB switching sections 33-1-33-M are left unchanged.

Figure 5:
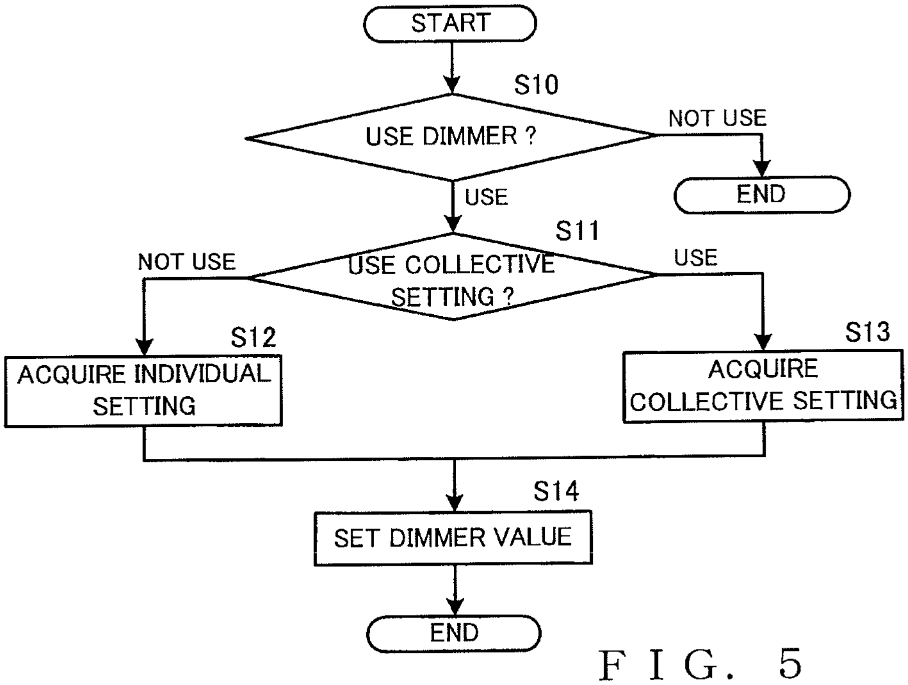
FIG. 5 is a flow chart showing an example operational sequence of dimmer setting processing performed in the embodiment of the mixing console.
Figure 7:
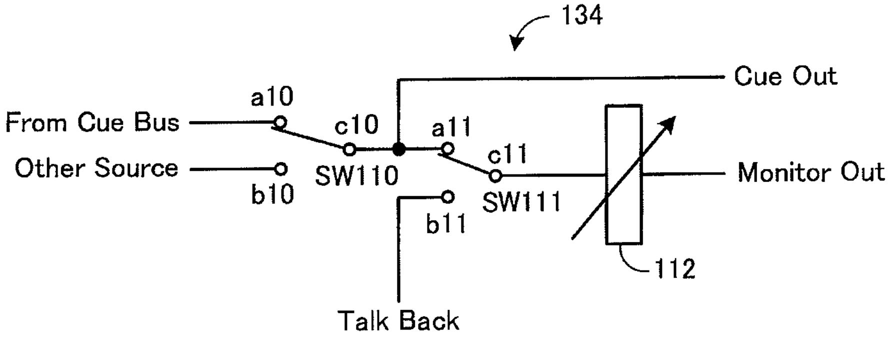
( PRIOR ART ) F I G. 7
FIG. 7 is a diagram showing a detailed construction of a cue/monitor section in the conventionally-known mixing console.

FIG. 5 is a flow chart showing example operational sequencing of dimmer setting processing performed in the instant embodiment of the mixing console 1 of the present invention.

The dimmer setting processing is started up once a TB switch provided on the operation section 16 for turning on or off the talkback function is operated to turn on the talkback function. In the dimmer setting processing, a setting process is performed for each of the TB switching sections 33-1-33-M. Upon start of the dimmer setting processing, a determination is made for each of the TB switching sections 33-1-33-M, at step S10, as to whether or not to use the dimmer. Here, a determination is made as to whether the switch 56 and switch 57 in the corresponding individual setting region is currently ON or not, or, for each TB switching section where the switch 57 in the corresponding individual setting region is currently OFF, a determination is made as to whether the switch 53 in the collective setting section is currently ON or not. If answered in the affirmative at step S10, control goes to step S11, where a further determination is made as to whether or not to use the collective setting option. For each TB switching section where the switch (self) 57 in the individual setting section is currently ON, it is determined that the collective setting option is not to be used, so that control branches to step S12. At step S12, a dimmer value currently set via the knob 55 in the individual setting region corresponding to the TB switching section in question is acquired. Further, for each TB switching section where the switch (self) 57 is currently OFF, not only it is determined that the collective setting option is to be used. Then, control branches to step S13, where a dimmer value currently set via the knob 52 in the collective setting region corresponding to the TB switching section in question is acquired. Upon completion of the operations of steps S10 to S13 for each of the TB switching sections 33-1-33-M, control moves on to step S14, where the dimmer value acquired at step S12 or S13 is set into the corresponding TB switching section and the corresponding switch SW41 is set into the aforementioned switchable state. After that, the dimmer setting processing is brought to an end. Note that, for each TB switching section where the switch (self) 57 in the individual setting section is currently ON but the switch 56 is currently OFF and for each TB switching section where the switch 53 in the collective setting section is currently OFF although the switch (self) 57 in the individual setting section is currently OFF, it is determined, at step S10, that the dimmer is not to be used, so that the dimmer setting processing is brought to an end without performing any other operation. Note that the dimmer value is set at "0" in the dimmer 40 in each TB switching section that does not use the dimmer.

In the above-described mixing console of the present invention, when the talkback function has been turned on, a mixed signal may be mixed with a talkback signal and output from the cue/monitor section 35 as a monitor output. In such a case, it is preferable to output the mixed signal after attenuating only the level of the talkback signal by means of the dimmer.

This application is based on, and claims priority to, JP PA 2009-169974 filed on 21 Jul. 2009. The disclosure of the priority application, in its entirety, including the drawings, claims, and the specification thereof, is incorporated herein by reference.

What is claimed is:

1. A mixing console comprising:

an input channel section having N input channels which control levels of one or more input audio signals and output the one or more level-controlled audio signals, wherein N is an integral number equal to or greater than one;

M mixing buses which mix one or more level-controlled audio signals from said input channel section to output one or more mixed signals, wherein M is an integral number equal to or greater than one;

an output channel section having M output channels which are supplied with the one or more mixed signals output from the M mixing buses;

M talkback input sections provided at a stage preceding respective ones of the M output channels of said output channel section;

a selection section which selects one or more of said M talkback input sections; and a talkback supply section to which a talkback signal is input, and which supplies the talkback signal to said talkback input sections, wherein, when the talkback signal is supplied at least to the talkback input section selected by said selection section, the talkback input section selected by said selection section attenuates an amplitude of the mixed signal supplied from a corresponding one of the M mixing buses, mixes the supplied talkback signal with the attenuated mixed signal to thereby generate a mixed output signal, and supplies the mixed output signal to a corresponding one of the M output channels, wherein each of said M talkback input sections includes:

an attenuator which attenuates the amplitude of the mixed signal supplied from the corresponding mixing bus;

a first switch operable to select one of the mixed signal supplied from the corresponding mixing bus and an output signal of said attenuator;

a second switch operable to select the talkback signal supplied by said talkback supply section; and a circuit which mixes output signals of the first and second switches, wherein the selected talkback input section selects the output signal of said attenuator as said attenuated mixed signal by said first switch and selects the talkback signal by said second switch to thereby output a signal obtained by mixing the signals selected by the first and second switches, and wherein each talkback input section not selected by said selection section from among the M talkback input sections selects the mixed signal supplied from the corresponding mixing bus by said first switch but does not select the talkback signal by said second switch, so that the talkback input section not selected by said selection section outputs only the mixed signal supplied from the corresponding mixing bus.

2. The mixing console as claimed in claim 1, wherein, when the selected talkback input section is supplied with the talkback signal in response to talkback-on operation, the selected talkback input section selects the output signal of said attenuator as said attenuated mixed signal by said first switch and selects the talkback signal by said second switch to thereby output a signal obtained by mixing the signals selected by the first and second switches.

3. The mixing console as claimed in claim 1, wherein said attenuator provided for each of said talkback input section is adjustable in attenuation amount thereof independently of other said attenuator.

4. The mixing console as claimed in claim 1, wherein said attenuator provided for each of said talkback input section is adjustable in attenuation amount thereof commonly with other said attenuator.

* * * * *